Dec. 1, 1959
V. M. BUSSEY
2,914,880
SNAG DISLODGER OR LURE RETRIEVER
Filed July 3, 1958
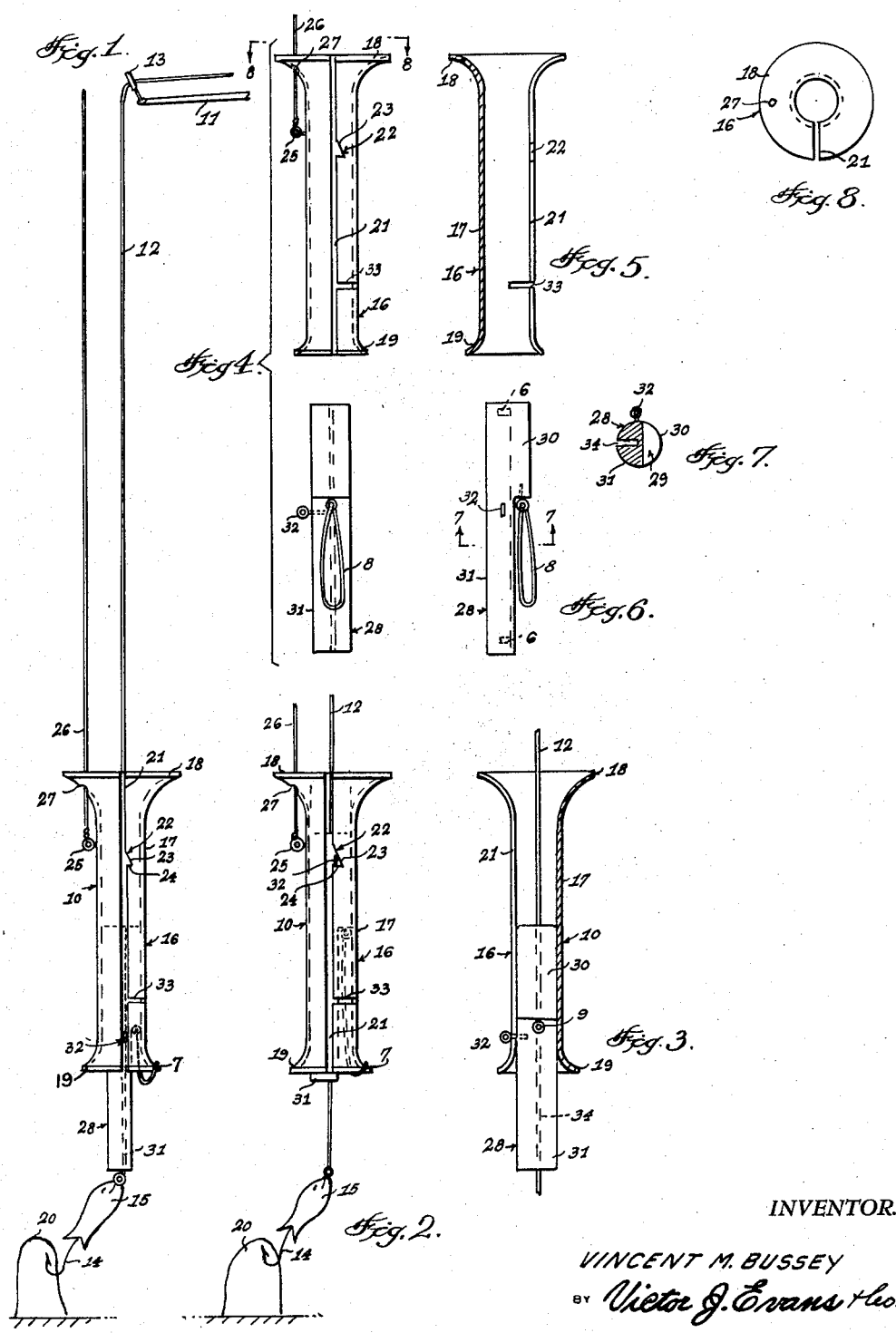
INVENTOR.
VINCENT M. BUSSEY
BY Victor J. Evans & Co.
ATTORNEYS

2,914,880
SNAG DISLODGER OR LURE RETRIEVER

Vincent M. Bussey, Creswell, Oreg.

Application July 3, 1958, Serial No. 746,383

2 Claims. (Cl. 43—17.2)

This invention relates to a device for dislodging fish hooks, lures, plugs or the like.

The object of the invention is to provide a device which is adapted to be used in conjunction with a fishing line, so that in the event that the fish hook should snag on an object such as a rock, log or the like, the device of the present invention can be utilized in such a manner as to readily free the hook from the rock or obstruction so that the hook can be retrieved whereby expensive loss of equipment will be prevented or minimized.

A still further object of the invention is to provide a device which is especially suitable for use in retrieving snagged fish lures or fish hooks wherein the device of the present invention can be used in a boat, or when standing on land, and wherein the device can be readily manipulated so as to permit the snagged hook or lure to be conveniently retrieved or recovered.

A further object of the invention is to provide a fish hook retriever which is extremely simple and inexpensive to manufacture.

Other objects and advantages will be apparent during the course of the following description:

In the accompanying drawing, forming a part of this application, and in which like numerals are used to designate like parts throughout the same.

Figure 1 is an elevational view illustrating the device of the present invention being used.

Figure 2 is a view similar to Figure 1 but showing parts in a different position.

Figure 3 is an elevational view, showing the parts in the position in Figure 1.

Figure 4 is a view showing the plunger and support member separated.

Figure 5 is a longitudinal sectional view taken through the support member.

Figure 6 is an elevational view of the plunger.

Figure 7 is a sectional view taken on line 7—7 of Figure 6.

Figure 8 is a sectional view taken on line 8—8 of Figure 4.

Referring in detail to the drawing, the numeral 10 indicates the snag dislodger or lure retriever of the present invention, and the numeral 11 indicates a portion of a conventional fishing rod or pole provided with the usual guide member 13 through which extends the fishing line 12. As shown in Figures 1 and 2, the numerals 14 and 15 indicate respectively the fish hook and lure or bait, and the numeral 20 indicates an object such as a rock or log on which the hook 14 may be snagged.

The retriever 10 of the present invention includes a support member which is indicated generally by the numeral 16. Figure 5, and the support member 16 includes a main portion 17 of cylindrical formation, and the ends 18 and 19 of the support member flare outwardly, the end 18 being larger than the end 19.

As shown in the drawing, the support member 16 is provided with a longitudinally extending slot 21, and the numeral 22 indicates a notch or cutout which is arranged in the support member 16, and the notch 22 communicates with the slot 21. The notch 22 is shaped to include an inclined surface 23 and an angularly arranged shoulder or surface 24, Figure 4. The numeral 25 indicates an eye member which extends outwardly from the support member 16 and which is connected thereto, and there is provided a line or cable 26 which has its lower end connected to the eye member 25. The line 26 extends through an opening 27 in the flanged portion 18 of the support member 16.

There is further provided a plunger which is indicated generally by the numeral 28 and the plunger 28 is adjustably or movably connected to the support member 16. The plunger 28 is provided with a lower cutaway portion 29 that defines an upper section 30 and a lower section 31, Figure 6. Extending outwardly from the section 31 and connected thereto is a lug or eye member 32, and the lug 32 is mounted to move into and out of engagement with the notch 22.

The support member 16 is provided with a recess 33, Figure 1, and the recess 33 is adapted to selectively receive therein the lug 32. The plunger 28 is provided with a longitudinally extending groove 34 through which extends the fishing line 12.

From the foregoing it is apparent that there has been provided a device which is especially suitable for use in retrieving snagged hooks, lures or the like. With the parts arranged as shown in Figures 1 and 2, it will be seen that in the event a hook such as the hook 14 becomes snagged or caught on an object such as the object 20, the hook can be retrieved. The device 10 is arranged so that the fishing line 12 extends through the groove 34 in the plunger 28. The plunger 28 is movably mounted in the support member 16, and the plunger 28 can be maintained in the raised position shown in Figure 2 by positioning the lug 32 in the notch 22 of the support member 16. The line 26 extends through the opening 27 in the flange 18, and the lower end of the line 26 is connetced to the eye member 25. This arrangement permits the device 10 to be moved up and down on the fishing line 12 so that the lower end of the plunger 31 can strike the lure 18 or bait 15 so as to help dislodge the hook 14 from the obstruction 20.

The device 10 can be raised by means of the line 26, and the line can be gripped in the fisherman's hand. Thus, by repeatedly raising the device 10 by means of the line 26, the device can be permitted to slide downwardly on the fishing line 12 when pressure is released on the line 26 so that the lower end of the plunger 28 will strike the upper portion of the lure or plug 15 whereby the fish hook 14 can be dislodged or unhooked from the object 20.

It is to be noted that the plunger 28 is adjustably connected to the support member 16, and with the parts arranged as shown in Figure 2, it will be seen that the lug 32 is held in the notch 22. However, as the lower end of the plunger 28 encounters or strikes the plug 16, the lug 32 will be knocked out of the notch 22 so that the lug 32 can move down through the slot 21 whereby the plunger 28 can move to the extended position as shown in Figure 1, from the retracted position shown in Figure 2. This extensible movement of the plunger 28 provides a striking force which helps provide the necessary impact to dislodge the hook 14 from the member 20.

When desired, the lug 32 can be arranged in engagement with the recess 33.

The parts can be made of any suitable material and in different shapes or sizes. The flaring ends 18 and 19 of the support member 16 acts as guide surfaces so as to facilitate the movement of the plunger 28 into or out of the support member 16.

The retriever of the present invention can be used from the banks of a stream or river, or from any other location and in use, the person can walk up the stream just far enough so that the retriever will slide down the line. In the event that the device jams, it is only necessary to walk downstream and pump the rod tip up and down slowly and if there is sufficient current, the device works back up the line so that the retriever can be used again. The proper amount of tension on the line is necessary to release the lure and the tip of the rod is held high enough to effectively work the device. If the retriever is used over water or in a boat, the manual trip can be used, and the manual trip is operated by means of the line 26.

The device can be used as an automatic snag dislodger or lure retriever and before the device is used it can be cocked so that when the device strikes the lure, the plunger will be tripped. The device is not intended to be used if the sinker is above the lure.

The lug 32 is engaged in the support member 33 only when putting the retriever on the line 12 or taking it off and this lines up the groove 34 in the plunger with the groove 21 in the support member. A resilient or rubber band 8 has one end anchored as at 9, while the other end of the band 8 is anchored to the end portion of the support member 16 at the point indicated by the numeral 7. The rubber band serves to give the device the necessary snap action which will help dislodge the hook or lure or other article. Spring hooks 6 are arranged on the ends of the plunger for helping to guide or maintain the line 12 in a proper position.

I claim:

1. In a device of the character described, a hollow support member including a main portion of cylindrical formation, said support member including an outwardly flared large flange at one end and an outwardly flared small flange at the opposite end, there being a longitudinally extending slot in said support member, said support member being provided with a notch which communicates with said slot, said notch including a flat shoulder and an inclined surface, an eye member connected to the main portion of said support member, there being an aperture in the large flared flange of the support member, a line extending through said aperture and connected to said eye member, a plunger slidably mounted in said support member, said plunger being provided with a lower cutaway portion that defines upper and lower sections, a lug extending outwardly from said plunger and said lug being mounted to move into and out of engagement with said notch, there being a recess in said support member in communication with said slot for at times receiving said lug, said plunger being provided with a longitudinally extended groove for the projection therethrough of a fishing line, and an elastic band being connected at one end to said plunger within the cutaway portion therein and at the opposite end to the small flared flange at the opposite end of the support member to bias the plug toward the small flared flange when the lug on the plunger is in said notch whereby when the lug on said plunger is moved outwardly of the recess in said support member, the elastic band will give the plunger a snap action to aid in dislodging a snagged fish hook or lure.

2. A device as in claim 1, wherein spring hooks are provided on the opposite ends of the plunger to maintain the fishing line in the longitudinally extended groove in said plunger.

References Cited in the file of this patent

UNITED STATES PATENTS

| | | |
|---|---|---|
| 2,179,598 | Palsson | Nov. 14, 1939 |
| 2,764,833 | Clark | Oct. 2, 1956 |
| 2,809,460 | Taylor | Oct. 15, 1957 |